United States Patent
Barth et al.

(10) Patent No.: US 11,370,345 B2
(45) Date of Patent: Jun. 28, 2022

(54) RECREATIONAL VEHICLE DRINKING WATER SUPPLY SYSTEMS

(71) Applicants: Christopher J. Barth, Bristol, IN (US); Mervin L. Hostetler, Sturgis, MI (US); Ernest S. Miller, Middlebury, IN (US)

(72) Inventors: Christopher J. Barth, Bristol, IN (US); Mervin L. Hostetler, Sturgis, MI (US); Ernest S. Miller, Middlebury, IN (US)

(*) Notice: Subject to any disclaimer, the term of this patent is extended or adjusted under 35 U.S.C. 154(b) by 0 days.

(21) Appl. No.: 16/873,930

(22) Filed: Aug. 5, 2020

(65) Prior Publication Data
US 2022/0041092 A1 Feb. 10, 2022

(51) Int. Cl.
- *B60P 3/34* (2006.01)
- *F25D 23/12* (2006.01)
- *B60P 3/22* (2006.01)

(52) U.S. Cl.
CPC ........... *B60P 3/34* (2013.01); *B60P 3/225* (2013.01); *B60P 3/2265* (2013.01); *B60P 3/2295* (2013.01); *F25D 23/126* (2013.01); *F25D 2323/122* (2013.01)

(58) Field of Classification Search
CPC .......... B60P 3/34; B60P 3/225; B60P 3/2265; B60P 3/2295; F25D 23/126; F25D 2323/122
USPC ....................................................... 296/156
See application file for complete search history.

(56) References Cited

U.S. PATENT DOCUMENTS

| | | | | |
|---|---|---|---|---|
| 4,017,116 A | * | 4/1977 | Hulsey | B60P 3/34 296/156 |
| 4,728,144 A | * | 3/1988 | Crean | B60P 3/32 296/156 |
| 4,746,164 A | * | 5/1988 | Crean | B60P 3/36 296/156 |
| 4,974,899 A | * | 12/1990 | Sargent | B60R 15/00 108/145 |
| 5,658,031 A | * | 8/1997 | DiBiagio | B60R 15/00 296/156 |
| 6,290,284 B1 | * | 9/2001 | Crean | B60P 3/34 296/168 |
| 2002/0189173 A1 | * | 12/2002 | Staschik | C02F 9/00 52/79.1 |
| 2005/0062305 A1 | * | 3/2005 | Blaudow | B60P 3/34 296/26.01 |
| 2011/0121606 A1 | * | 5/2011 | Engelbrecht | B62D 33/06 296/156 |

(Continued)

FOREIGN PATENT DOCUMENTS

| | | | | |
|---|---|---|---|---|
| GB | 2421224 A | * | 6/2006 | ............. B60P 3/34 |
| KR | 2019108279 A | * | 9/2019 | |

OTHER PUBLICATIONS

Translation of KR 279 (Year: 2019).*

Primary Examiner — Hilary L Gutman
(74) Attorney, Agent, or Firm — Ryan M. Fountain

(57) ABSTRACT

A drinking water supply arrangement is provided for a RV, which uses fluid conduits separate from the other fresh water supply lines of the RV, separates the pump from the living RV compartment, provides independent pump controls, and stores conventional containers of drinking water in an exteriorly accessible, temperature controlled compartment, isolated from the living compartment.

11 Claims, 1 Drawing Sheet

(56) References Cited

U.S. PATENT DOCUMENTS

2013/0062906 A1\* 3/2013 Parkes .................... B60R 15/00
                                                                                    296/165
2020/0399142 A1\* 12/2020 Majeric .................. B01D 5/006

\* cited by examiner

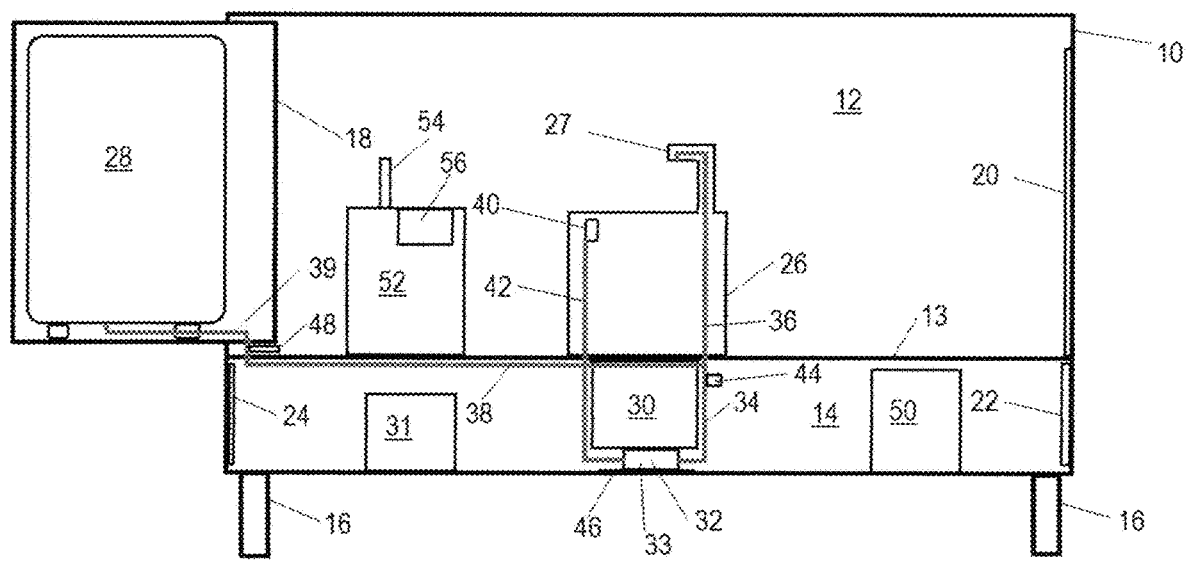

RECREATIONAL VEHICLE DRINKING WATER SUPPLY SYSTEMS

BACKGROUND OF THE INVENTION

The present invention relates generally to providing fresh and clean drinking water for recreational vehicles ("RVs"), such as travel trailers, toy haulers, fifth wheel trailers, motor homes, and like vehicles having at least living quarters therein (and as otherwise defined by the Recreational Vehicle Industry Association). Additional information about RVs can be found on the internet at www.rvia.org.

RVs are typically versatile vehicles which may be used for concurrently or separately hauling or storing equipment, other vehicles, personal property, people, and animals. RVs are often used for camping and/or recreation, or as temporary living quarters for an extended period of time. As such, the it is often desirable for a RV to be self-contained in terms of its water supply, having an adequate supply of both clean water for drinking, and clean water for other uses, such as washing, showering, bathing, laundry, etc. Previously, this was accomplished by constructing the RV with large freshwater supply tanks, and well as grey and blackwater waste water receiving tanks, both permanently mounted in the vehicle chassis.

At the same time, it has been desirable to construct RVs with many of the comforts and conveniences of a conventional residential, fixed home, including full-sized appliances, such as residential style refrigerators. These residential features are often fixedly mounted or positioned within the RV, including within the slide-out portions of the RV. However, when mounting appliances within the slide-out portions, careful consideration must be given to slide-out movement when laying out power lines and water lines (such as to refrigerator ice makers and water dispensers). Accordingly, certain floor plans for RVs can need to be designed around (or at least substantially revised to accommodate) the spacial requirements of these features, as well as the necessary plumbing and/or electrical connections.

While a RV can be used for an extended period of time, it is often necessary to "winterize" or otherwise prepare a RV for a substantial period of non-use. In such circumstances, plumbing lines have previously been flushed, for example, with non-freezing fluids. However, doing so can leave a distasteful or unhealthy residue in the drinking water lines when the RV is again prepared for use, unless a substantial amount of water is used to flush the lines clean again. Moreover, when a RV's freshwater tank has been left unused for a substantial period of time (and even when it has been in use for a significant period of time) the residual water therein can become stale or otherwise undrinkable. Accordingly, in some prior RV water systems, it has been necessary to periodically disinfect the water supply and/or sanitize its components. However, typically, there is no convenient or easy way to remove the RV's freshwater tanks from the RV chassis for cleaning or drying out. Flushing the tank to keep the water more "fresh" can require a substantial volume of water (as well as time and effort), which is not always readily available or even permissible in some communities.

It has been suggested to use conventional residential or commercial bottled water systems in RVs. However, there are substantial spacial constraints in a RV which are not present to the same degree in a fixed residence. These spacial constrains can limit the suitability of such conventional bottled water systems in a RV because, for example, of limited space for system installation placement and spare water bottle storage, as well as more significant noise reduction requirements. A RV may not be nearly as well insulated against room-to-room sound transmission as a much larger fixed house, so the pump operation of such conventional bottled water systems can be more noticeable in a RV. Also, when not connected to an unlimited source of electric power (such as when a RV is "boondocking"), the "constant on" pumps typically used in conventional bottled water systems can present a significant and unwarranted drain on the available electric batteries in a RV. In addition, the "constant on" of such conventional pumps can result in operational problems if the water bottle empties and the pump stays on.

Further, since a RV is by its nature a "vehicle," conventional bottled water systems would be subjected to significant vibrational and other physical stresses (directionally, both side-to-side and front-to-back with respect to the vehicle) from over the road and off-road travel which could adversely affect their performance, especially over time. In addition, when implementing any water supply system in a RV, serious consideration must be given to keeping overall weight to a minimum, in order to improve fuel economy of the vehicle. Further, weight distribution within the vehicle needs to be taken into account, especially with towed RVs, such that, for example, tongue weight is appropriate with respect to the towing vehicle, and trailer balance is maintained for proper braking, sway reduction, etc.

Also, conventional bottled water systems established in commercial and some residential environments have personal security not available in a RV environment. For example, in a fixed building application, replacement water bottles can be brought by well-known and trusted vendors directly into the building with a pass-key arrangement. In contrast, since RV's are often placed on campgrounds only seasonally, and the particular bottled water vendor available in that community may not be at all familiar to the RV owner or user, such pass-key arrangements into the RV could present an undesirable security risk (or medical risk if, for example, a COVID-19 quarantine about the RV was in place). Accordingly, using a conventional bottled water system in a RV may require the RV users to manually service the system with replacement water bottles themselves. Such bottles are typically five gallon bottles, weighing approximately 42 pounds. The age, agility, and strength of many RV users would make such a task difficult and/or uncomfortable.

Further, conventional bottled water systems typically have pump controls in close proximity to (or incorporated into the housing for) the pump itself, so as to reduce system cost and mounting requirements. While such arrangements can be completely satisfactory in a fix residence, where the pump placement is not subject to significant spacial constraints, in a RV the extra space taken up by such pumps may only be available in locations where access to the pump controls is limited or remote from the water dispensement. As a result, pumps may need to be left in a "constant on" mode, or else the RV user would be required to forego significant convenience in repeatedly accessing those controls as needed.

As a result, many RV users have foregone the use of conventional RV water supply systems for drinking water or other vehicle-mounted drinking water systems. Instead, they have, for example, stocked up on large quantities of twelve ounce or one liter bottles (and such) of drinking water in disposable beverage containers. While this practice does provide the users with a reliable and convenient source of drinking water, it is typically more expensive to purchase water in such containers, the storage of such containers can take up much of the limited space in a RV, and when empty, those containers present a substantial environmental burden if not properly disposed of. Further, this practice does not support ice making or cold water dispensing capacities of many times of refrigerators available for use in a RV.

OBJECTIVES OF THE INVENTION

Accordingly, a primary objective of the invention is to provide improved fresh and clean drinking water systems for recreational vehicles. These improvements include providing such arrangements which:
a. are inexpensive to manufacture, install, maintain, and repair,
b. increase floor plan and appliance optimization when used in a vehicle, such as a RV,
c. minimize component weight,
d. provide more sanitary drinking water,
e. minimize pump sound transmission into the RV living area,
f. facilitate greater temperature control over the drinking water,
g. minimize electrical energy requirements,
h. facilitate system operation, maintenance, and control, and
i. promote RV safety and security.

SUMMARY OF THE INVENTION

These and other objectives of the present invention are achieved by the provision of a drinking water supply arrangement in a RV which uses fluid conduits separate from the other fresh water supply lines of the RV, separates the pump from the living RV compartment, provides independent pump controls, and stores conventional containers of drinking water in an exteriorly accessible, temperature controlled compartment, isolated from the living compartment.

In preferred embodiments, conventional five gallon jugs of drinking water are stored in a "pass-through" compartment beneath the main floor of a living compartment, and are connectable in turn as needed both to a refrigerator having cold water and ice dispensing features and to a kitchen island faucet. The pass-through compartment can be temperature controlled to prevent drinking water from freezing or becoming too warm, and can serve to store both empty and full water bottles, as well as to isolate the pump noise from the living compartment. The drinking water fluid conduits can be valved to allow compressed air (or other sanitizing fluids) to remove the water therefrom when the RV is not being used for extended periods of time or to clean/sanitize the fluid conduits.

Other objects, advantages, and novel features of the present invention will become readily apparent from the following drawing and detailed description of certain preferred and alternative embodiments.

BRIEF DESCRIPTION OF THE DRAWING

The drawing shows a cross-sectional schematic view, across the lateral sides of a RV embodying the present invention.

DETAILED DESCRIPTION OF PREFERRED EMBODIMENTS

The drawing shows schematically, and in best mode versions, embodiments of the present invention, as applied to either a travel trailer-type or a motorhome-type of RV, both generically and specifically. The drawing is not "to scale" with actual "build" embodiments, the features therein being, for example, laterally spread out for ease of viewing.

The following features are illustrated in the drawing by these numerals:
10. A recreational vehicle ("RV"),
12. An interior living compartment (of which there may be more than one arranged, for example, longitudinally from front to back within the RV), such as a kitchen/dining area,
13. The floor of the living compartment,
14. A storage area or compartment below floor 14, such as a "pass-through" storage compartment, although in alternative embodiments this compartment may be longitudinally separated from the living compartment (forward or rearward within the RV), in order to more completely isolate pump noise from the living compartment and/or in order to more conveniently locate the storage compartment according to the RV floor plan and manufacturing optimization,
16. The RV wheels,
18. A conventional "slide-out" portion, which is movable laterally in and out of the living compartment, as needed for increasing space within the living compartment or minimizing the RV footprint for travel,
20. A door between the living compartment and the exterior of the RV, which is preferably lockable and unlockable only by the user,
22. A door between the storage compartment and the exterior of the RV, which is preferably lockable and unlockable with multiple passkeys (one of which may be temporarily provided to a bottled water vendor local to the campground being used by the RV), and which is dimensioned so as to allow easy placement into and removal of drinking water containers from the arrangement of the present invention within the storage compartment,
24. A door between the storage compartment and the exterior of the RV, which is preferably lockable and unlockable only by the user.
26. A conventional central island mounted to the floor within the living compartment,
27. A faucet mounted to the island, for dispensing drinking water,
28. A conventional refrigerator disposed with the slide-out portion, and preferably having cold water and ice dispensing features,
30. A conventional drinking water bottle or jug, such as a five gallon container, disposed within the storage compartment and arranged for immediate use within the present invention,
31. Representative extra drinking water jug, empty or full, stored for use subsequent to container 30 or stored for disposal from use prior to container 30, disposed at any convenient location within the storage area,
32. A receiver or receptacle for removable connection to container 30, formed in a conventional manner or as otherwise needed in conjunction with the specific nature of the opening to container 30, to allow water to be removed from container 30 without leakage and to securely hold container 30 in place both during RV transit and stationary use,
33. A pump (preferably operable from a 12 volt electrical power supply) for moving drinking water from container 30 to the fluid conduits of the present invention, which may be integrated into the receiver (as shown, where an inverted container 30 format is used) or formed in a separate housing and positioned adjacent to the receiver (such as where an upright container 30 format is used) or remotely from container 30 (such as where manufacturing preferences dictate optimization), 34. A fluid conduit, connected to pump 33, for receiving drinking water from container 30, 36. A fluid conduit, connected to fluid conduit 34, for providing drinking water to faucet 27 though island 26, 38. A fluid conduit, also connected to fluid conduit 34, for providing drinking water to refrigerator 28 to support its cold water and ice dispensing features (although in alternative embodiments, conduits 36 and 38 can be connected directly to pump 33, without splitting out from conduit 34), 39. A slide-out fluid conduit, typically flexible in nature, or otherwise accommodating the movement of the slide-out portion, preferably in a conventional manner, connected to fluid conduit 38 for that purpose of providing water to the refrigerator, 40. A pump control device or switching assembly, preferably mounted to a side of the island adjacent to the faucet and unobtrusive to use of the island, for turning the pump on and off as needed to supply drinking water to the faucet, 42. A control line connected between the pump control device and the pump, for transmitting control signals to the pump, preferably formed from conventional electrical wire, but alternatively of a conventional IR (infrared) or other wireless nature (wherein the line of the drawing would denote only a signal path), 44. A valve assembly, connected to conduit 34, adapted to allow connection to a source of compressed air (or other sanitizing fluid) to be blown into the fluid conduits to remove the drinking water therefrom (and as needed, conduits 36, 38, and 39 can be disconnectable from the faucet and refrigerator for that purpose), 46. A dampening mount receiving the pump thereon, so as to reduce vehicle vibration to and from the pump, as well as reduce pump noise, preferably formed from conventional resilient material such as rubber or flexible foam, 48. A conventional conduit take-up or tensioning device connected to conduit 39 (and disposed within or under the slide-out portion, as desired) to keep plumbing to the slide-out portion operational and properly located as the slide-out portion is moved, 50. A conventional temperature control assembly, such as a vehicular HVAC system, for selectively heating and/or cooling the storage compartment sufficiently to control temperature of the drinking water, which may be integrated with or separate from the HVAC system used for the rest of the RV, and 52. A conventional fresh water supply system for the RV, which provides clean water for uses other than drinking, such as dishwashing and hand washing, and which may include faucet 54 and sink 56 incorporated therein, but which utilizes fluid conduits for supplying water which are independent and separate from conduits 34, 36, 38, and 39.

In general, the present invention provides a separate drinking water fluid supply circuit (formed, for example, from food grade conduits) within the RV, which shares only the conventional grey water tank and disposal lines already in place for disposal of unused drinking water. The RV users can limit pump operation to only time periods when the drinking water is present in the container and being dispensed, rather than having the pump constantly turned on. Further, the pump is placed remotely within the RV and separate from its actuation switch, so as to minimize noticeable pump sound by the RV user, as well as increase convenience for RV users. Similarly, drinking water containers are conveniently placed and used so as to not take up the limited RV interior space. At the same time, since RV's are typically constructed so that there is no access between the living compartment and storage compartments therebeneath, the drinking water containers can be accessed for servicing by a person having no access to the RV living compartment or its contents (the passkey to door 22 being different from the key to door 20).

Although the present invention has been shown and described herein with respect to certain preferred embodiments and alternative configurations, those were by way of illustration and example only. For example, although only a single drinking water bottle was shown as connected to the arrangement of the present invention, where high volumes of drinking water are expected to be used, multiple drinking water containers can be so connected, such as in series. Also, while a pass-through storage compartment has been shown, in other embodiments, the drinking water containers can be instead placed within as dedicated, one-door compartment.

Accordingly, the spirit and scope of the present invention is intended to be limited only by the terms of the appended claims.

What is claimed is:

1. A drinking water supply arrangement, comprising:
   a recreational vehicle having
      a living compartment,
      a slide-out portion extendable from the living compartment,
      a storage area beneath the living compartment,
      a receiver, for removable connection to a container of drinking water, located in the storage area,
      fluid conduits connected into the living compartment and slide-out portion from the storage area,
      a pump connected to the receiver and the fluid conduits, for providing drinking water from the container to the living compartment and the slide-out portion,
      a pump control device located in the living compartment, for selectively operating the pump, and
      wherein the living compartment includes a faucet for dispensing drinking water and the slide-put portion includes an appliance for dispensing ice, and the fluid conduits are connected to the faucet and the appliance.

2. The arrangement according to claim 1 wherein a valve assembly is connected to the fluid conduits which is adapted to allow compressed air to be blown into the fluid conduits, and the fluid conduits are removably connected to the faucet and appliance.

3. A drinking water supply arrangement, comprising:
   a recreational vehicle having
      a living compartment,
      a slide-out portion extendable from the living compartment,
      a storage area beneath the living compartment,
      a receiver, for removable connection to a container of drinking water, located in the storage area,
      fluid conduits connected into the living compartment and slide-out portion from the storage area,
      a pump connected to the receiver and the fluid conduits, for providing drinking water from the container to the living compartment and the slide-out portion, a pump control device located in the living compartment, for selectively operating the pump, and wherein the recreational vehicle has an additional water supply system for providing water to the living compartment and the fluid conduits are independent from that water supply system.

4. A drinking water supply arrangement, comprising:
a recreational vehicle having
   a living compartment,
   a slide-out portion extendable from the living compartment,
   a storage area beneath the living compartment,
a receiver, for removable connection to a container of drinking water, located in the storage area,
fluid conduits connected into the living compartment and slide-out portion from the storage area,
a pump connected to the receiver and the fluid conduits, for providing drinking water from the container to the living compartment and the slide-out portion,
a pump control device located in the living compartment, for selectively operating the pump, and
wherein the appliance is a refrigerator with cold drinking water and ice dispensing capacity.

5. A drinking water supply arrangement, comprising:
a recreational vehicle having
   a living compartment,
   a slide-out portion extendable from the living compartment,
   a storage area beneath the living compartment,
a receiver, for removable connection to a container of drinking water, located in the storage area,
fluid conduits connected into the living compartment and slide-out portion from the storage area,
a pump connected to the receiver and the fluid conduits, for providing drinking water from the container to the living compartment and the slide-out portion,
a pump control device located in the living compartment, for selectively operating the pump, and
wherein the faucet is mounted on an island in the living compartment and the pump control device is mounted on a side of that island in close proximity to the faucet.

6. A drinking water supply arrangement, comprising:
a recreational vehicle having
   a living compartment,
   a slide-out portion extendable from the living compartment,
   a storage area beneath the living compartment,
a receiver, for removable connection to a container of drinking water, located in the storage area,
fluid conduits connected into the living compartment and slide-out portion from the storage area,
a pump connected to the receiver and the fluid conduits, for providing drinking water from the container to the living compartment and the slide-out portion,
a pump control device located in the living compartment, for selectively operating the pump, and
wherein the storage area has a door providing access thereto from the exterior of the recreational vehicle, and the door is of sufficient size as to allow placement of the container of drinking water in connection with the receiver.

7. The arrangement according to claim 6 wherein the temperature of the storage area can be selectively modified to be different from the external environment such that the temperature of the drinking water supplied by the arrangement is controlled.

8. The arrangement according to claim 6 wherein the pump is mounted in the storage area.

9. The arrangement according to claim 8 wherein sound reduction elements are connected to the pump.

10. The arrangement according to claim 8 wherein the pump is not operating when drinking water is not being drawn from the faucet.

11. The arrangement according to claim 6 wherein the storage compartment is isolated from the living compartment such that the door to the storage compartment does not provide a person with access to the living compartment.

* * * * *